(12) United States Patent
Jania et al.

(10) Patent No.: US 9,245,182 B2
(45) Date of Patent: Jan. 26, 2016

(54) ENHANCING DATA IN A SCREENSHOT

(75) Inventors: Frank L. Jania, Chapel Hill, NC (US);
Lawrence M. Wright, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2413 days.

(21) Appl. No.: 12/057,408

(22) Filed: Mar. 28, 2008

(65) Prior Publication Data

US 2009/0249189 A1    Oct. 1, 2009

(51) Int. Cl.
*G06F 17/00*      (2006.01)
*G06K 9/00*       (2006.01)
*G06F 17/22*      (2006.01)
*G06F 17/30*      (2006.01)

(52) U.S. Cl.
CPC ........ *G06K 9/00469* (2013.01); *G06F 17/2247* (2013.01); *G06F 17/2288* (2013.01); *G06F 17/30896* (2013.01)

(58) Field of Classification Search
CPC ............ G06K 9/00469; G06F 17/2288; G06F 17/30896; G06F 17/2247
USPC .......................... 715/255, 234, 229, 205, 206
See application file for complete search history.

(56) References Cited

U.S. PATENT DOCUMENTS

| | | | |
|---|---|---|---|
| 5,929,854 A * | 7/1999 | Ross ............................. | 715/783 |
| 7,600,182 B2 * | 10/2009 | Carr et al. ..................... | 715/222 |
| 7,721,202 B2 * | 5/2010 | Fuchs et al. .................. | 715/249 |
| 2004/0095371 A1* | 5/2004 | Haynes et al. ................ | 345/711 |
| 2005/0022129 A1* | 1/2005 | Borenstein et al. ........... | 715/734 |
| 2007/0050703 A1* | 3/2007 | Lebel ............................. | 715/513 |

* cited by examiner

*Primary Examiner* — Thu Huynh
(74) *Attorney, Agent, or Firm* — Cuenot, Forsythe & Kim, LLC

(57) ABSTRACT

A computer-implemented method of enhancing data in a screenshot can include capturing a screenshot of content presented on a display and identifying within the content at least a first element comprising first semantic data. A first semantic representation of the first semantic data can be generated and the first semantic representation can be associated with the first element. The first semantic representation and the screenshot can be output.

18 Claims, 6 Drawing Sheets

ENHANCING DATA IN A SCREENSHOT

FIELD OF THE INVENTION

The embodiments of the present invention relate to user interfaces for electronic systems and, more particularly, to generating screenshots.

BACKGROUND OF THE INVENTION

Screenshots are images of content presented on a display, or a portion thereof, and typically provide a static representation of the display at a particular moment. For example, a screenshot can depict a computer's desktop as it appears at the time the screenshot is taken, as well as application windows that may be open, messages that are displayed, and the like. Screenshots are quite valuable in that they easily convey information in an applicable context. Accordingly, they are commonly used as a means of communication. For example, screenshots are sometimes used to depict display activity and error messages generated by computer software when an error has occurred on a computer. Such screenshots then may be electronically communicated to software support personnel for problem solving purposes. Screenshots also are often used in computer application tutorials to depict user inputs required in a particular workspace. For instance, a tutorial may include a series of screenshots, each representing a different step of a user interactive process.

BRIEF SUMMARY OF THE INVENTION

The embodiments disclosed herein relate to enhancing data in a screenshot. One embodiment of the present invention can include a computer-implemented method of enhancing data in a screenshot. The method can include capturing a screenshot of content presented on a display and identifying within the content at least a first element comprising first semantic data. A first semantic representation of the first semantic data can be generated and the first semantic representation can be associated with the first element. The first semantic representation and the screenshot can be output.

In another embodiment of the present invention, the method can include capturing a screenshot of content presented on a display and identifying within the content at least a first element. At least a second element can be identified that is associated with the first element in a hierarchical relationship wherein the first element is a parent element and the second element is a child element. The hierarchical representation can be associated with the first element. The hierarchical representation and the screenshot can be output.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
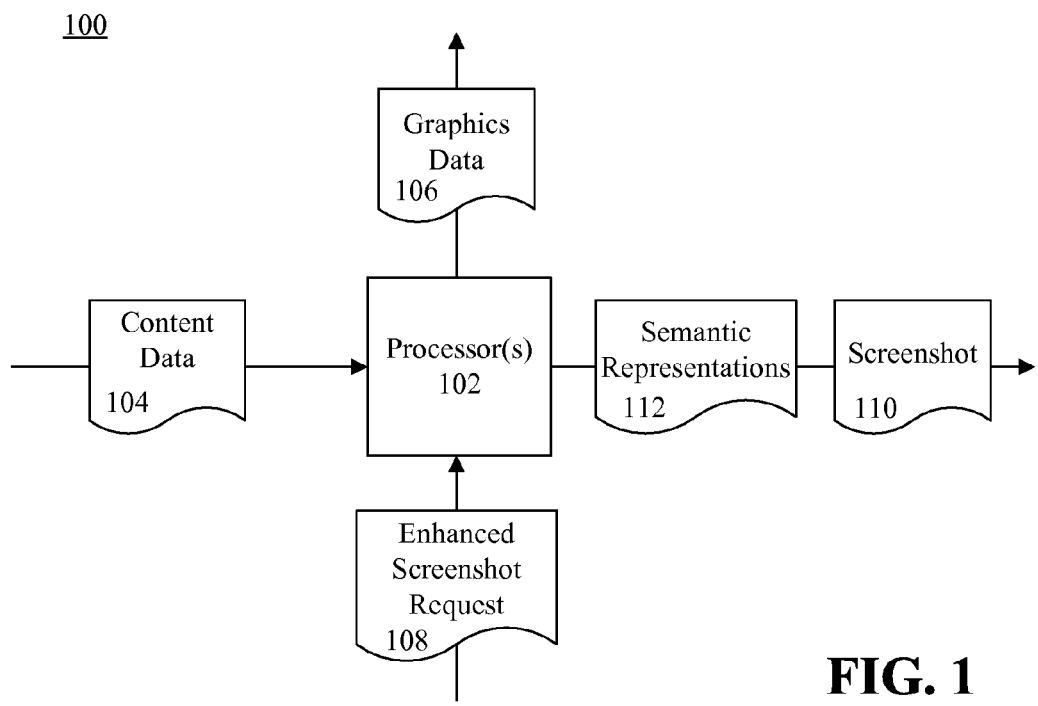
FIG. 1 depicts a data flow diagram in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 depicts a data flow diagram 100 in accordance with one embodiment of the present invention. The data flow diagram 100 represents data that can be received and generated by one or more processor(s) 102 in a data processing system, such as that previously described. During operation, the processor 102 can receive content data 104 for content to be presented on a display, and output corresponding graphics data 106. As known to the skilled artisan, the graphics data 106 can be communicated to a display adapter for further processing prior to being communicated to a display for presentation, or communicated directly to the display in a suitable format.

A request 108 to generate an enhanced screenshot can be received by the processor. In response, the processor 102 can process the content data 104 to generate a screenshot 110 of the content, or a portion of the content, presented on the display. As used herein, the term "screenshot" means a reproduction of content presented on a display that is saved as a static image, for example as a bitmap (BMP) image, a portable network graphic (PNG) image, a Joint Photographic Experts Group (JPEG) image, a Graphics Interchange Format (GIF) image, or the like.

In addition, as will be described herein, the processor 102 can generate semantic representations 112 that correspond to semantic data of elements contained in the content captured within the screenshot 110. Examples of semantic data include, but are not limited to, alphanumeric characters, character sequences, words, terms, symbols, and the like. The term "semantic representation", as used herein, means an object that represents, but is distinct from, an element's semantic data as presented in a screenshot. For example, in the screenshot 110, an element's semantic data may comprise image pixels contained within the screenshot 110. The corresponding semantic representations 112 of the semantic data, however, can comprise information that is distinct from such image pixels. For example, in one embodiment the semantic representations 112 can comprise non-image based data, such as text, metadata, markup language or the like, that may be presented independently from a rendering the screenshot 110. In another embodiment, the semantic representations 112 can comprise images that may be presented independently from the screenshot 110, or displayed as overlays to the screenshot 110.

The semantic representations 112 then can be associated with the respective elements from which they were generated, and the processor 102 can output the screenshot 110 and semantic representations 112. The semantic representations 112 can be used to convey semantic information about the elements within the screenshot 110, as will be described.

Figure 2:
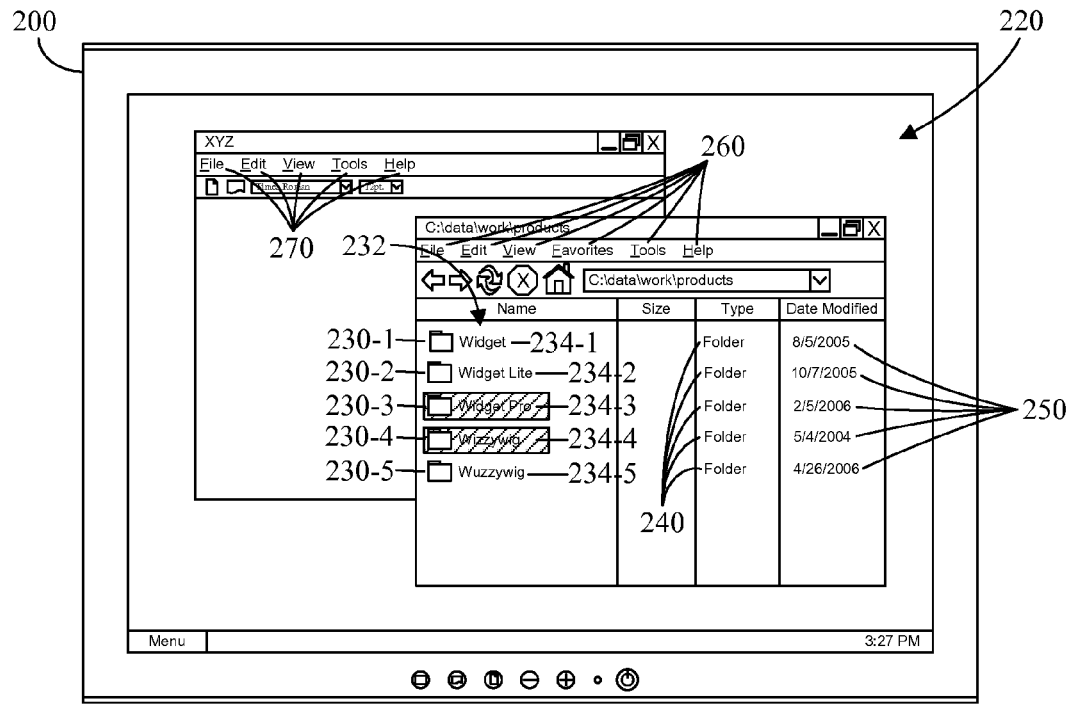
FIG. 2 depicts a display in accordance with one embodiment of the present invention.
Figure 3:
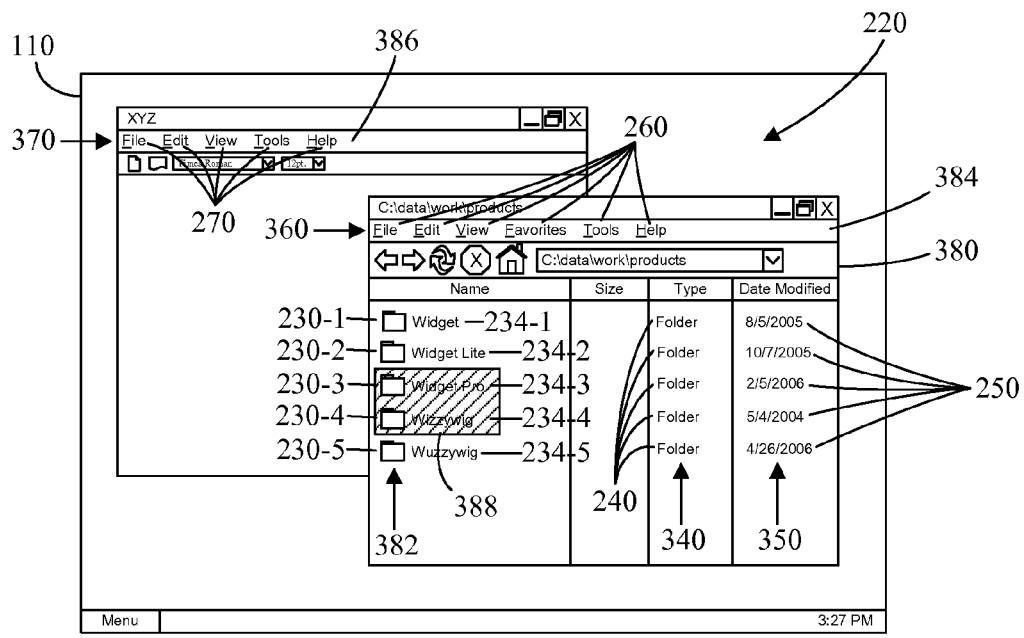
FIG. 3 depicts a screenshot in accordance with one embodiment of the present invention.

FIG. 2 depicts a display 200 in accordance with one embodiment of the present invention. The display 200 may be coupled to the processor 102 of FIG. 1 via suitable system components (e.g. display adapter, I/O bus, etc.), and the display 200 can receive graphics data which may be processed to visually present content 220. The content 220 can be presented via a graphical user interface (GUI), a text user interface (TUI), a command line interface (CLI), a three-dimensional interface, or any other suitable interface. FIG. 3 depicts the screenshot 110, which may be captured while the content 220 is presented on the display 200.

Making reference to FIGS. 1, 2 and 3, when the screenshot 110 is captured, the content data 104 can be processed to identify the content 220 that will be visible within the screenshot 110. Such content data 104 can be further processed to identify elements within the visible content 220 that comprise semantic data. For instance, elements 230 which are folder objects and/or within an element list can be identified. Elements 240, 250 associated with the folder objects and/or element list also can be identified. Further, elements 260, 270 which are menu items can be identified. Still, any other elements can be identified and the invention is not limited in this regard. Moreover, the types of elements that are to be identified can be defined, and such definitions can be user configurable. For instance, a user can select folder objects as elements 230 to be identified, while other types of elements 240-270 may be ignored.

In one embodiment, the elements 230-270 can be identified recursively. For instance, when the elements 230 are being identified, the identification process can begin with the first element 230-1 which, in this example, is the topmost element of an element list 232 comprising the elements 230. Next, the element 230-2 can be identified, then the element 230-3, followed by the element 230-4, and finally the element 230-5.

When the elements 230-270 are identified, the semantic representations 112 of their corresponding semantic data can be generated and associated with the elements 230-270. For example, referring to FIG. 2, when the element 230-1 is identified, its semantic data 234-1 can be processed to generate a corresponding semantic representation 112, and the semantic representation 112 can be associated with the element 230-1. Similarly, when the element 230-2 is identified, its semantic data 234-2 can be processed to generate a corresponding semantic representation 112, and that semantic representation can be associated with the element 230-2. Moreover, when the elements 230-3, 230-4, 230-5 are identified, corresponding semantic representations can be generated for their respective semantic data 234-3, 234-4, 234-5.

The elements 230-270 can be identified and the semantic representations can be generated in real time. As used herein, the term "real time" means a level of processing responsiveness that a user senses as sufficiently immediate or that enables a processor to keep up with some external process. Accordingly, when the screenshot 110 is captured, the elements 230-270 can be identified before the content 220 presented on the display 200 changes, thus insuring that the identified elements 230-270 correspond to the elements 230-270 depicted in the screenshot 110.

Figure 4:
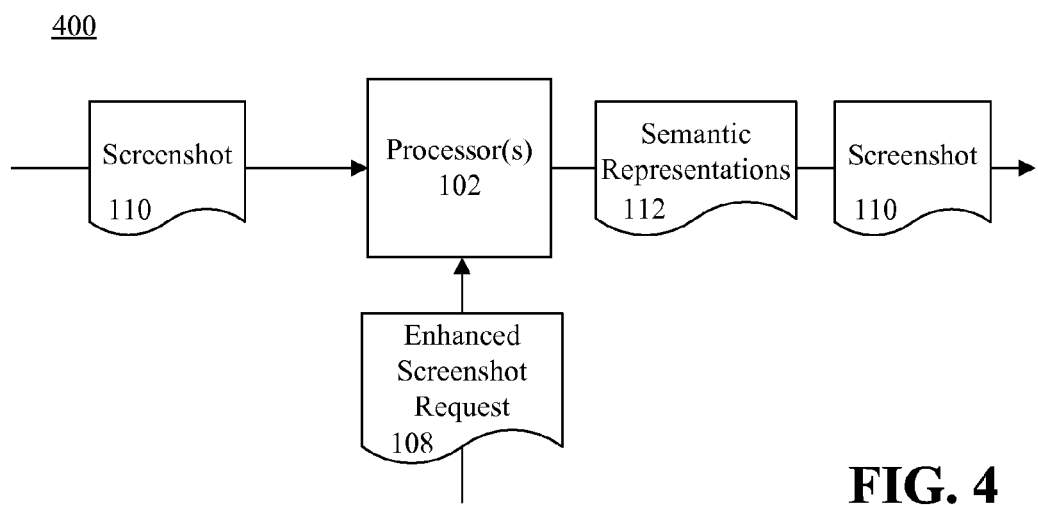
FIGS. 4-5 depict data flow diagrams in accordance with various embodiments of the present invention.

Reference now is made to FIG. 4, which depicts a data flow diagram 400 in accordance with another embodiment of the present invention. In contrast to the above example in which the elements are identified and the semantic representations 112 are generated based on the content data 104, in this embodiment the semantic representations 112 can be generated from the screenshot 110. The semantic representations 112 can be generated when the screenshot 110 is captured, or at a later time. Indeed, in this embodiment, the semantic representations 112 need not be generated by the system on which the screenshot 110 was captured.

Making reference to FIGS. 2, 3 and 4, desired elements 230-270 can be identified by processing the screenshot 110. During such processing, optical character recognition (OCR) and/or image recognition can be applied to the screenshot 110 to identify one or more of the elements 230-270 within the screenshot 110, as well as corresponding semantic data depicted therein. OCR and image recognition are both known to the skilled artisan.

Any of a myriad of parameters can be processed to select the desired elements 230-270 to be identified and the corresponding semantic data. Such parameters can include, but are not limited to, spatial references, formatting of semantic data, the nature of semantic data identified in the screenshot 110, identified icon types, and so on.

By way of example, the elements 230 can be identified based on their positioning with respect to one another, their positioning with respect to elements 240, 250, their positioning within a frame 380, their positioning with respect to elements 260 that are menu items, the proximity of the semantic data 234 to the icons 382 of the elements 230, etc. The manner in which the semantic data 234 is formatted also can be evaluated.

Similarly, the elements 240-270 can be identified based on their respective positions/layout, formatting of their respective semantic data 340, 350, 360, 370, or the like. For instance, the semantic data 350 of the elements 250 can be identified based on the semantic data 350 being in date format and contained within the frame 380, and the semantic data 360, 370 of the respective elements 260, 270 can be identified based on the semantic data 360, 370 being in a menu format and/or being contained within menu bars 384, 386.

In another aspect of the present embodiments, one or more elements 230-270 can be selected to be included in or excluded from element identification. For instance, referring to FIGS. 1 and 2, in an embodiment in which content data 104 is processed to identify the elements 230-270, elements 230-3, 230-4 can be selected to be excluded from element identification by selecting them (e.g. with a cursor, keystroke(s), a spoken utterance, or other suitable input), identifying a region of the display 200 in which they are positioned, or the like. Alternatively, the elements 230-3, 230-4 can be selected to be exclusively included in element identification, and any other elements 230-270 not selected can be ignored in the element identification process. The element selections can be communicated to the processor 102 when, or prior to, processing of the content data 104 to generate the semantic representations 112.

Referring to FIG. 3, in an embodiment in which element identification is performed by processing the screenshot 110, a region 388 of the screenshot 110 can be selected to include and/or exclude the elements 230-3, 230-4 in the element identification process. The region 388 can be selected while the screenshot 110 is presented on a display, such as the display 200, using a cursor, keystroke(s), a spoken utterance, or other suitable input. Such selections can be communicated to the processor 102 when, or prior to, processing of the screenshot 110 to generate the semantic representations 112.

The present invention is not limited to representations that are semantic in nature. By way of example, reference now is made to FIG. 5, which depicts the data flow diagram 500 in accordance with another embodiment of the present invention. In addition to generated semantic representations 112, the processor 102 can process content data 104 and/or the screenshot 110 to recursively identify hierarchical element relationships within the content, and such relationships can be represented by the hierarchical representations 532 that are output with the screenshot 110, which is depicted in FIG. 6.

As used herein, the term "hierarchical representation" means an object that represents an element's hierarchical relationship with one or more other elements. For example, in one embodiment the hierarchical representation 532 can comprise non-image based data, such as text, metadata, markup language or the like. In another embodiment, the hierarchical representation 532 can comprise an image that may be presented independently from the screenshot 110, or as an overlay to the screenshot 110.

Figure 5:
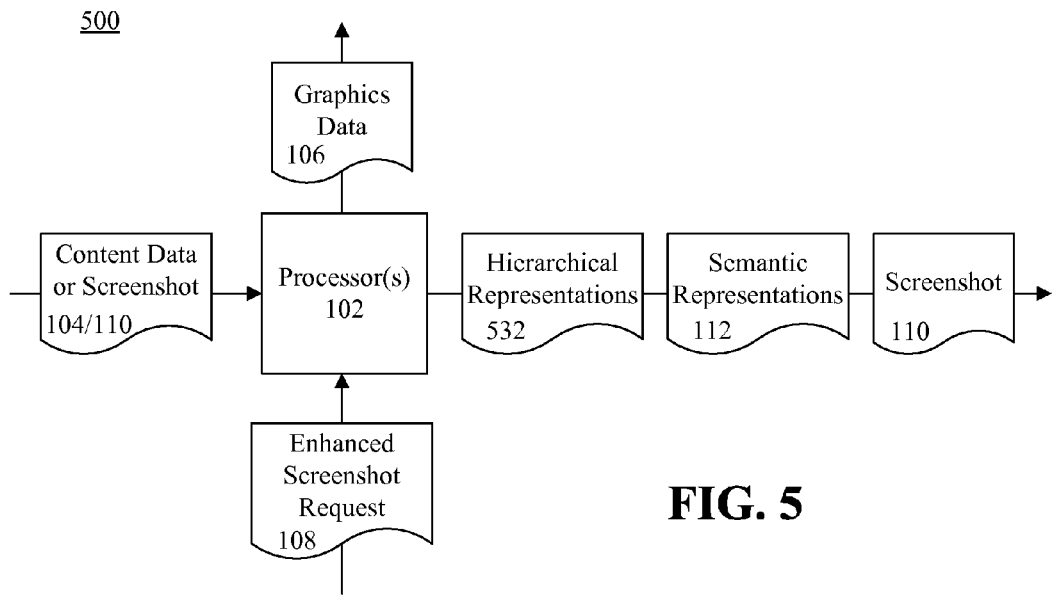
Figure 6:
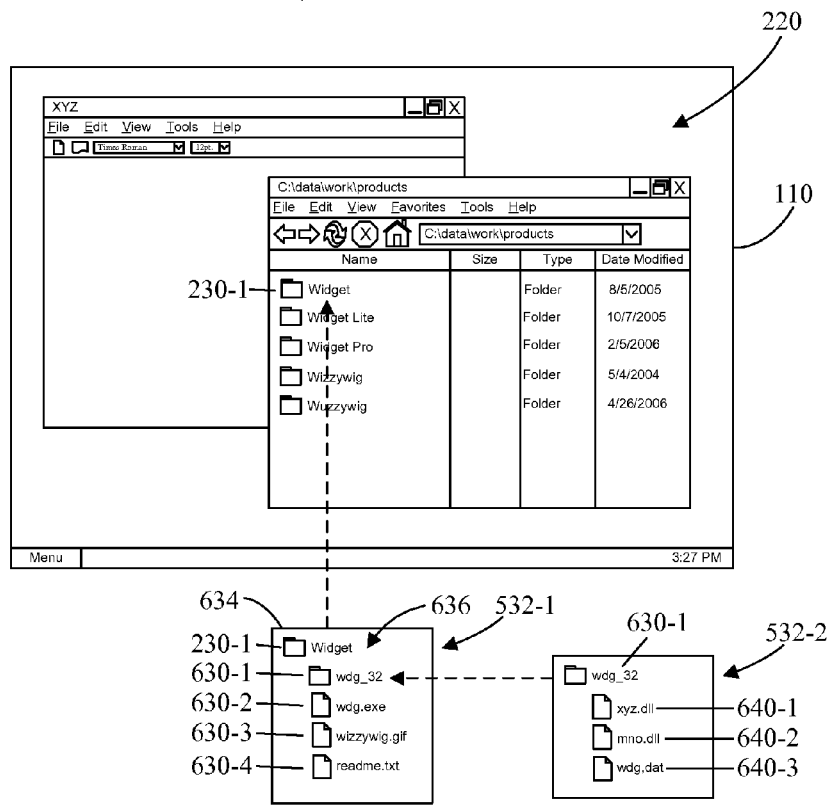
FIGS. 6-8 depict the screenshot of FIG. 3 in accordance with various embodiments of the present invention.

Referring to FIGS. 5 and 6, assume that the element 230-1 is a folder object representing a parent element, or parent leaf, in a file system hierarchy. Also assume that with the element 230-1 there are one or more associated child elements 630-1, 630-2, 630-3, 630-4, or child leafs, which in this example are not visible when the screenshot 110 is captured. When the content data 104 is processed by the processor 102 in response to the enhanced screenshot request 108, the child elements 630-1, 630-2, 630-3, 630-4 can be identified and their hierarchical relationships can be identified based on parameters contained in the content data 104. A hierarchical representation 532-1 of the hierarchical relationship between the parent element 230-1 and the child elements 630 then can be generated and associated with the parent element 230-1 and/or the child elements 630. In one embodiment, child element identification can be limited to those elements that are associated with semantic data, or that have child elements of their own that are associated with semantic data.

If the child elements 630 are visible on the display when the screenshot 110 is captured, either the content data 104 can be processed as previously described, or the screenshot 110 can be processed by the processor 102 to identify the child elements 630. If the screenshot 110 is processed, the hierarchical relationships can be identified based on spatial references, formatting of semantic data, the nature of semantic data identified in the screenshot 110, identified icon types, or the like. For instance, if the child elements 630 are listed below the parent element 230-1, but offset in a particular direction, a parent-child hierarchical relationship between the element 230-1 and the child elements 630 can be identified.

In one embodiment, the hierarchical representation 532-1 can comprise an image 634 of an element tree 636 that depicts the child elements 630. Optionally, the element 230-1 can be depicted as a parent of the child elements 630. In another embodiment, the hierarchical representation 532-1 can comprise non-image related data, such as text, metadata, markup language or the like. Such non-image related data can be provided in addition to, or in lieu of, the image 634.

Further, additional semantic representations 112 and/or hierarchical representations 532 can be generated for the child elements 630. For example, if the child element 630-1 is also a parent element having child elements of its own 640-1, 640-2, 640-3, a hierarchical representation 532-2 of such hierarchical relationships can be generated. Moreover, recursive processing can be applied by the processor 102 to generate semantic representations 112 and/or hierarchical representations 532 for any other elements having a hierarchical relationship with identified elements. In one embodiment, such recursive processing can be limited to a certain number of levels within the hierarchy, though this is not a requirement. By way of example, when the enhanced screenshot request 108 is received, a user can be prompted to indicate whether to apply recursive processing to all hierarchy levels or to limit such processing to a certain number of levels. Limiting the recursive processing can reduce the total amount of data that will be required for the semantic representations 112 and hierarchical representations 532 that are generated.

Figure 7:
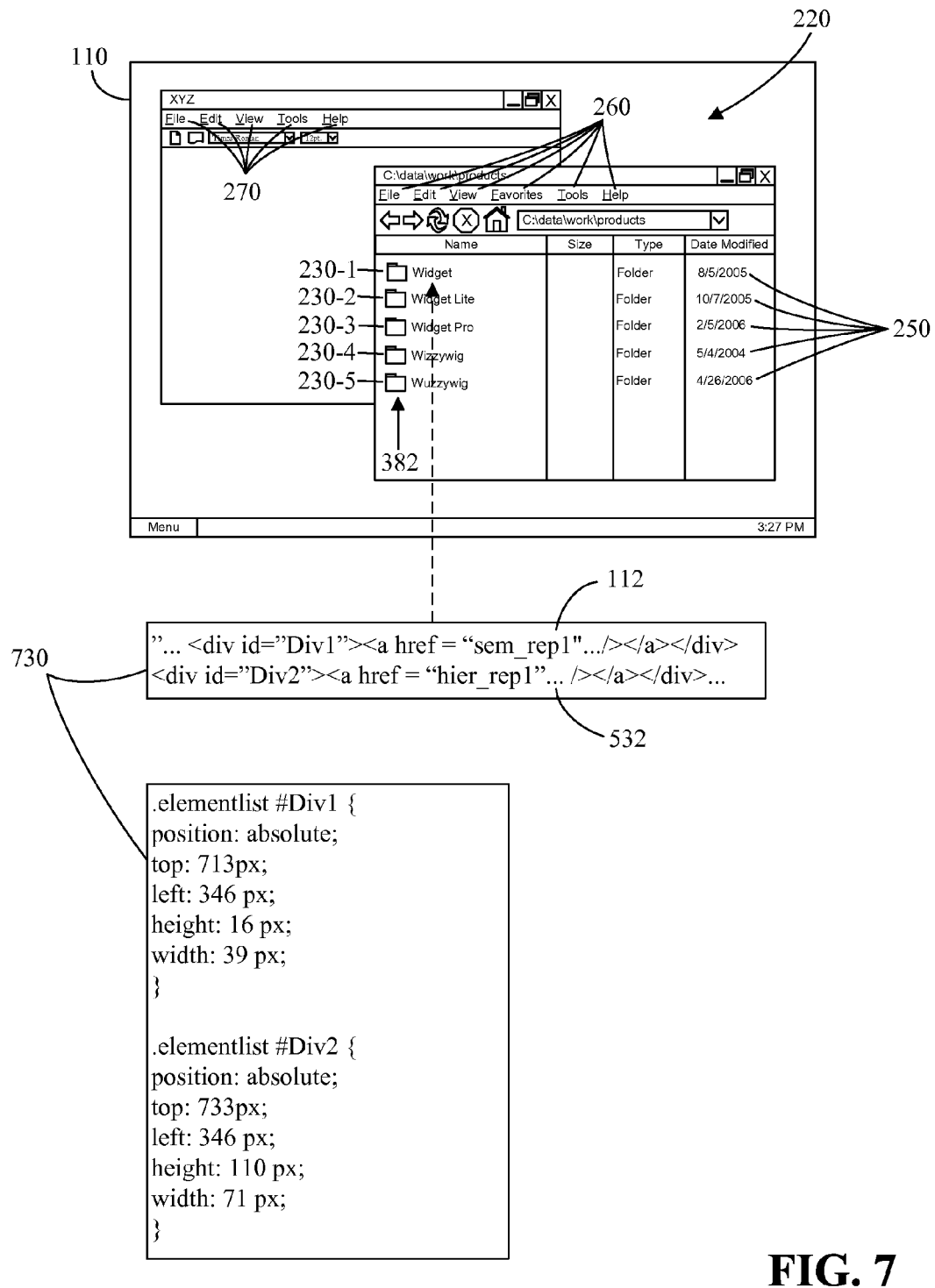

Referring to FIG. 7, which depicts the screenshot 110 in accordance with another embodiment of the present invention, the semantic representations 112 and/or hierarchical representation 532 that are generated for the content 220 can be arranged and organized in any suitable manner. For instance, the semantic representations 112 and/or hierarchical representation 532 can be arranged and organized based on positioning of the elements 230-270 with which they are associated within the screenshot 110, icons 382 comprised by the elements 230-270 and/or heuristic algorithms.

In example, the semantic representation 112 and/or hierarchical representation 532 for a particular element 230-1 can include, or otherwise be associated with, data 730 that identifies a region within the screenshot 110 occupied by the element 230-1. For example, the data 730 can be used to create an accessible image map of the screenshot 110 using a markup language, such as HyperText Markup Language (HTML), a Cascading Style Sheet (CSS) and/or any other suitable software tools. Alternatively, the semantic representations 112 and/or hierarchical representations 532 can be included within, or otherwise identified by, metadata within a file containing the screenshot 110. In another embodiment, a cell table comprising a plurality of cells can be created. The screenshot 110 can be included in at least one of the cells, and the semantic representations 112 can be included in at least one other cell. Still, the semantic representations 112 and hierarchical representations 532 can be associated with the screenshot 110 in any other suitable manner and the invention is not limited in this regard.

As noted, the screenshot 110 and its associated semantic representations 112 and/or hierarchical representations 532 can be output. As used herein, "output" or "outputting" can include, but is not limited to, storing data in memory, e.g., writing to a file, writing to a user display or other output device, e.g., playing audible notifications, sending or transmitting to another system, exporting, or the like. For example, the screenshot 110 and its associated semantic representations 112 and/or hierarchical representations 532 can be communicated to another system for presentation to a second user who may interact with the screenshot 110.

Figure 8:
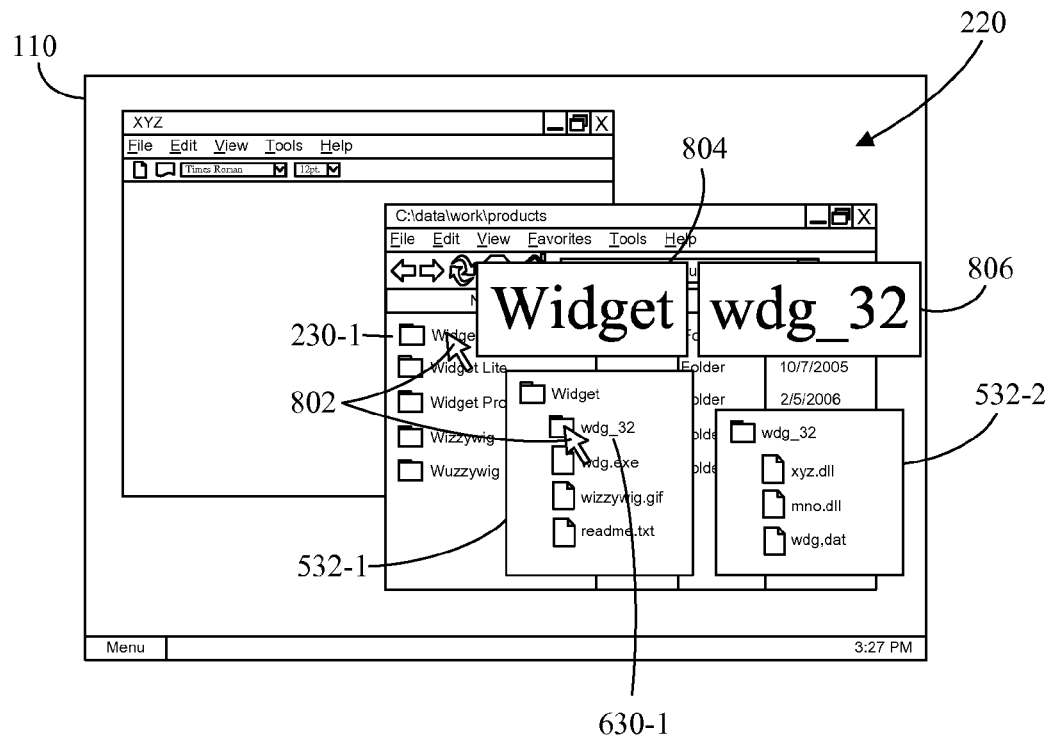

Referring to FIG. 8, a screenshot 110 with which semantic representations 112 and/or hierarchical representations 532 have been associated can be presented to a user. When a region of the screenshot 110 comprising an identified element is selected, for instance using a curser 802, keystroke(s) or spoken utterance, semantic representations and/or hierarchical representations associated with the element can be presented. For example, if the element 230-1 is selected, its semantic representation can be presented. If, for instance, the semantic representation comprises an image 804, such image 804 can be displayed. If the semantic representation comprises speech synthesis markup, the semantic representation can be presented audibly, for instance using text-to-speech (TTS) algorithms. Still, the semantic representation can be presented in any other suitable manner and the invention is not limited in this regard.

Further, if the element 230-1 is associated with a hierarchical representation 532-1, the hierarchical representation 532-1 also can be presented in a suitable manner, for example as an image or as audio presented using TTS. Moreover, if an element 630-1 within the hierarchical representation 532-1 is selected, for instance using a curser 802, keystroke(s) and/or a spoken utterance, its associated semantic representation 806 and/or hierarchical representation 532-2 also can be presented, for example as an image or as audio, regardless of whether the element 630-1 is visible within the screenshot 110.

Figure 9:
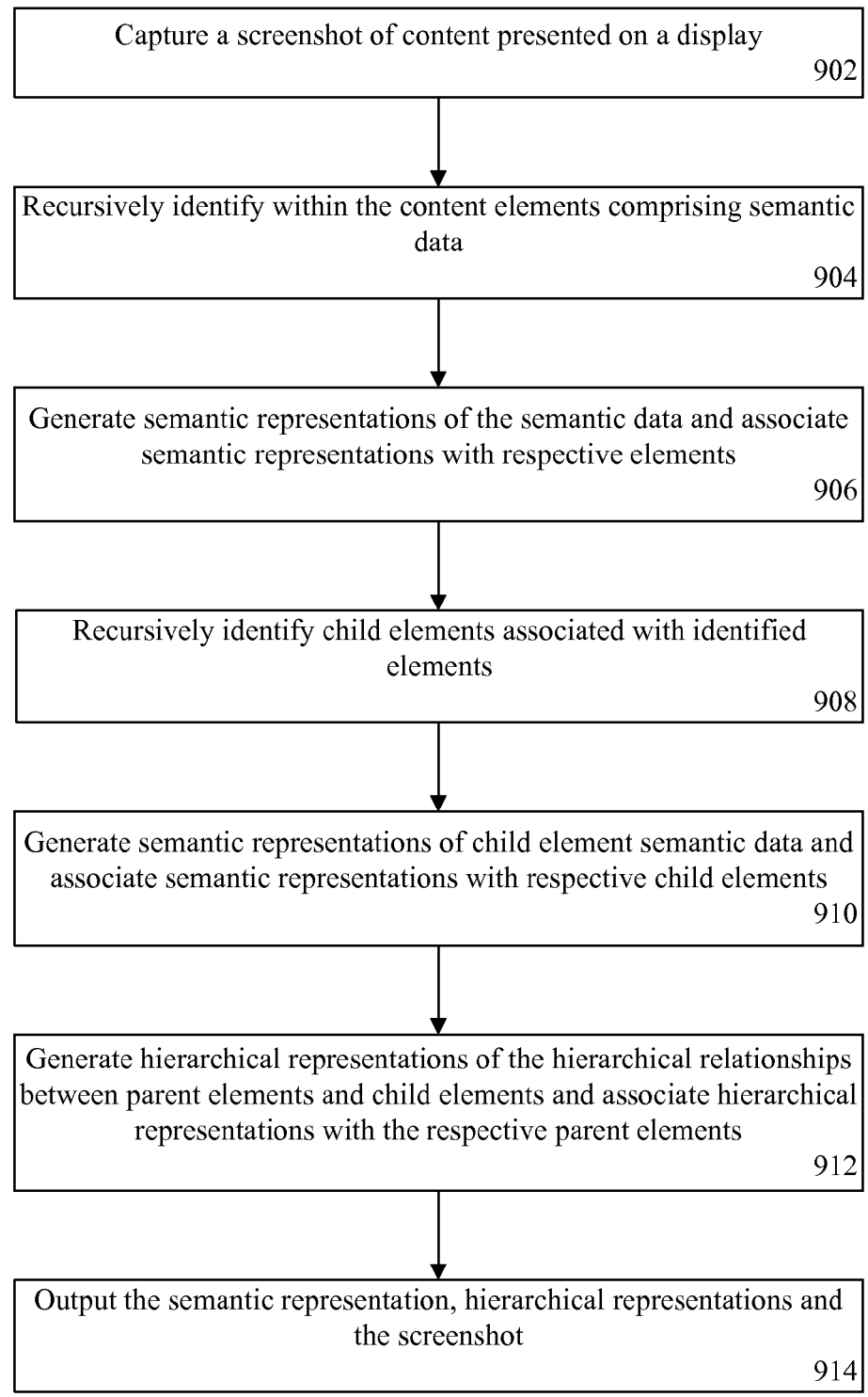
FIG. 9 is a flowchart illustrating a method of enhancing data in a screenshot in accordance with another embodiment of the present invention.

FIG. 9 is a flowchart illustrating a method 900 of enhancing data in a screenshot in accordance with another embodiment of the present invention. At step 902, a screenshot of content presented on a display can be captured. At step 904, elements within the content that was captured by the screenshot and that comprise semantic data can be recursively identified. At step 906, semantic representations of the semantic data can be generated and associated with the respective elements contained in the screenshot.

At step 908, child elements associated with identified elements can be recursively identified. For example, if a particular element is a parent element having child elements, each such child element can be identified. If any of the child elements are also parent elements having child elements of their own, their child elements also can be identified, and so on. At step 910, semantic representations of child element semantic data can be generated and associated with the respective child elements. At step 912, hierarchical representations of the hierarchical relationships between parent elements and child elements can be generated and associated with the respective parent elements. Optionally, such hierarchical relationships also can be associated with the child elements.

At step 914, the semantic representations, the hierarchical representations and the screenshot can be output.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of enhancing data in a screenshot, comprising:
   capturing a screenshot of content presented on a display;
   identifying within the content at least a first element comprising first semantic data;
   generating a first semantic representation of the first semantic data;
   associating the first semantic representation with the first element; and
   outputting the first semantic representation and the screenshot, wherein
   the identifying the at least the first element comprises recursively identifying within the content a plurality of elements comprising semantic data.

2. The method of claim 1, further comprising:
   identifying at least a second element associated with the first element in a hierarchical relationship wherein the first element is a parent element and the second element is a child element;
   generating a hierarchical representation of the hierarchical relationship between the first element and the second element;
   associating the hierarchical representation with the first element; and
   outputting the hierarchical representation.

3. The method of claim 2, wherein identifying the second element comprises:
   identifying an element that is not visible on the display when the screenshot is captured.

4. The method of claim 2, further comprising:
   generating a second semantic representation of semantic data comprised by the second element;
   associating the second semantic representation with the second element; and
   outputting the second semantic representation.

5. The method of claim 2, wherein identifying at least the second element comprises:
   recursively identifying a plurality of elements associated with the first element in hierarchical relationships.

6. The method of claim 2, wherein generating the hierarchical representation comprises:
   generating a hierarchical representation selected from the group consisting of metadata and markup language.

7. The method of claim 2, wherein generating the hierarchical representation comprises generating an image.

8. The method of claim 1, wherein generating the first semantic representation comprises:
   generating a semantic representation selected from the group consisting of metadata and markup language.

9. The method of claim 1, wherein generating the first semantic representation comprises generating an image.

10. The method of claim 1, wherein identifying within the content at least the first element comprises:
    processing content data from which the screenshot was generated.

11. The method of claim 1, wherein identifying within the content at least the first element comprises:
    processing the screenshot.

12. A computer-implemented method of enhancing data in a screenshot, comprising:
    capturing a screenshot of content presented on a display;
    identifying within the content at least a first element;
    identifying at least a second element associated with the first element in a hierarchical relationship wherein the first element is a parent element and the second element is a child element;
    generating a hierarchical representation of the hierarchical relationship between the first element and the second element;
    associating the hierarchical representation with the first element; and
    outputting the hierarchical representation and the screenshot, wherein
    the identifying the at least the first element comprises recursively identifying within the content a plurality of elements comprising semantic data.

13. The method of claim 12, wherein identifying the second element comprises:
    identifying an element that is not visible on the display when the screenshot is captured.

14. A computer program product, comprising:
a computer-usable storage device having stored therein computer-usable program code for enhancing semantic data in a screenshot,
the computer-usable program code, which when executed by a computer hardware system, causes the computer hardware system to perform
capturing a screenshot of content presented on a display;
identifying, within the content, at least a first element including first semantic data;
generating a first semantic representation of the first semantic data;
associating the first semantic representation with the first element; and
outputting the first semantic representation and the screenshot, wherein
the identifying the at least the first element comprises recursively identifying within the content a plurality of elements comprising semantic data, and
the computer-usable storage device is not a transitory, propagating signal.

15. The computer program product of claim 14, wherein the computer-usable program code further causes the computer hardware system to perform:
identifying at least a second element associated with the first element in a hierarchical relationship wherein the first element is a parent element and the second element is a child element;
generating a hierarchical representation of the hierarchical relationship between the first element and the second element;
associating the hierarchical representation with the first element; and
outputting the hierarchical representation.

16. The computer program product of claim 15, wherein the computer-usable program code further causes the computer hardware system to perform:
identifying an element that is not visible on the display when the screenshot is captured.

17. The computer program product of claim 15, wherein the computer-usable program code further causes the computer hardware system to perform:
generating a second semantic representation of semantic data comprised by the second element;
associating the second semantic representation with the second element; and
outputting the second semantic representation.

18. The computer program product of claim 14, wherein the first semantic representation is selected from the group consisting of metadata, markup language, and an image.

* * * * *